United States Patent
Preston, Jr.

(10) Patent No.: US 8,341,066 B2
(45) Date of Patent: Dec. 25, 2012

(54) SYSTEM AND METHOD FOR DETERMINING OPTIMAL INVESTMENT STRATEGY

(76) Inventor: John E. Preston, Jr., Clementon, NJ (US)

( * ) Notice: Subject to any disclaimer, the term of this patent is extended or adjusted under 35 U.S.C. 154(b) by 1137 days.

(21) Appl. No.: 11/934,058

(22) Filed: Nov. 1, 2007

(65) Prior Publication Data

US 2008/0109384 A1    May 8, 2008

Related U.S. Application Data

(60) Provisional application No. 60/864,124, filed on Nov. 2, 2006.

(51) Int. Cl.
*G06Q 40/00* (2012.01)
(52) U.S. Cl. .......................................... 705/37
(58) Field of Classification Search .................. 705/37, 705/36 R, 35, 26.3, 14.71
See application file for complete search history.

(56) References Cited

U.S. PATENT DOCUMENTS

| | | | |
|---|---|---|---|
| 6,415,268 B1 | 7/2002 | Korisch | |
| 6,484,152 B1 | 11/2002 | Robinson | |
| 7,167,837 B1* | 1/2007 | Ciampi et al. ................ | 705/35 |
| 7,555,452 B2* | 6/2009 | Van Lier ..................... | 705/36 R |
| 2002/0077946 A1 | 6/2002 | Caplan et al. | |
| 2002/0099636 A1* | 7/2002 | Narumo ........................ | 705/36 |
| 2002/0138383 A1 | 9/2002 | Rhee | |
| 2002/0147671 A1 | 10/2002 | Sloan et al. | |
| 2003/0004845 A1 | 1/2003 | Takeda et al. | |
| 2003/0033229 A1 | 2/2003 | Keyes et al. | |
| 2003/0083971 A1* | 5/2003 | Kawamoto et al. ............ | 705/36 |
| 2003/0088492 A1 | 5/2003 | Damschroder | |
| 2003/0135445 A1 | 7/2003 | Herz et al. | |
| 2005/0060254 A1 | 3/2005 | Jones | |
| 2005/0131794 A1* | 6/2005 | Lifson ............................ | 705/36 |
| 2005/0149422 A1 | 7/2005 | Van Lier | |
| 2005/0154658 A1 | 7/2005 | Bove et al. | |
| 2005/0187846 A1 | 8/2005 | Subbu et al. | |
| 2005/0187849 A1 | 8/2005 | Bollapragada et al. | |
| 2005/0187851 A1 | 8/2005 | Sant | |
| 2005/0234809 A1 | 10/2005 | Criner | |
| 2005/0273409 A1 | 12/2005 | Voudrie | |

(Continued)

FOREIGN PATENT DOCUMENTS

DE    10101329 A1    7/2002

(Continued)

OTHER PUBLICATIONS

Minimum-variance portfolio composition. Clarke, Roger et al. Journal of Portfolio Management. Winter 2011.*

(Continued)

*Primary Examiner* — Hani M Kazimi
*Assistant Examiner* — John Preston
(74) *Attorney, Agent, or Firm* — Christopher Wood; Premier Law Group, PLLC

(57) ABSTRACT

An artificial expert system and method for determining whether to buy, sell, or hold a specific Individually Traded Unit (ITU) of publicly traded units residing in a securities or investment portfolio owned or controlled by a user, wherein the portfolio comprises of at least the trading statistics of each ITU. In one embodiment, the invention provides a user with a rational basis: to sell the optimum number of ITU's to unload at the optimum ITU sale price or buy the optimum number of ITU's to purchase at the optimum ITU purchase price or recommend that the user neither buy nor sell any of the selected ITU's.

14 Claims, 19 Drawing Sheets

U.S. PATENT DOCUMENTS

| | | |
|---|---|---|
| 2006/0020526 A1 | 1/2006 | Viner |
| 2006/0059069 A1 | 3/2006 | Glinberg et al. |
| 2006/0080199 A1 | 4/2006 | Tarbox et al. |

FOREIGN PATENT DOCUMENTS

| | | |
|---|---|---|
| JP | 2003-85376 | 3/2003 |
| KR | 10-2002-0073953 | 9/2002 |
| KR | 10-2004-0046605 | 6/2004 |
| WO | WO 96/06402 | 2/1996 |
| WO | WO 03/073220 A2 | 9/2003 |

OTHER PUBLICATIONS

Investigating the effectiveness of robust portfolio optimization techniques. Guastaroba, Gianfranco et al. Journal of Asset management. Sep. 2011.*

27-stock portfolio to ensure optimal returns. Nuryushida Laily Yusof. Business times. Jul. 16, 2001.*

* cited by examiner

Visual ProVestment Exponential Method
Test 19
Sample Research

Stock Symbol: AMD
Sample Size 3

| Business Day | Closing Price | Mean | Standard Deviation |
|---|---|---|---|
| 88 | $17.62 | | |
| 89 | $17.50 | | |
| 90 | $17.50 | $17.54000 | 0.069282520 |

Now Trades:

| | Trading Business Day | Return Dollar Value | Current Cash Reserve | Idle Uninvested Cash | Current Stock Price | Auto Sample Size | Current Mean Price | Current Standard Deviation | PV Recomended Action |
|---|---|---|---|---|---|---|---|---|---|
| 090 | 04/03/1996 | $0.00 | $640,000.000 | $640,000.000 | $17.50 | 3 | $17.54000 | 0.069282520 | Hold |
| 091 | 04/04/1996 | $506,828.40 | $133,136.600 | $133,136.600 | $17.25 | 6 | $17.45667 | 0.128478400 | Buy 6,012 |
| 092 | 04/08/1996 | $611,850.50 | $311,310.800 | $31,971.960 | $17.87 | 7 | $17.51571 | 0.195351000 | Sell 5,410 |
| 093 | 04/09/1996 | $612,761.80 | $233,865.500 | $31,971.960 | $17.62 | 2 | $17.74500 | 0.176776700 | Hold |
| 094 | 04/10/1996 | $605,626.40 | $149,237.400 | $31,971.960 | $17.50 | 2 | $17.56000 | 0.084853410 | Hold |
| 095 | 04/11/1996 | $605,053.30 | $45,049.710 | $31,971.960 | $17.25 | 2 | $17.37500 | 0.176776700 | Hold |
| 096 | 04/12/1996 | $616,184.50 | $53,973.990 | $25,361.630 | $17.12 | 2 | $17.18500 | 0.091923290 | Hold |
| 097 | 04/15/1996 | $619,382.40 | $84,580.800 | $25,361.630 | $17.25 | 3 | $17.20667 | 0.075055060 | Hold |
| 098 | 04/16/1996 | $622,213.90 | $209,673.400 | $25,361.630 | $17.12 | 3 | $17.16334 | 0.075055050 | Hold |
| 099 | 04/17/1996 | $618,599.00 | $51,290.340 | $25,361.630 | $16.87 | 5 | $17.12200 | 0.155144700 | Buy 1,204 |
| 100 | 04/18/1996 | $624,163.80 | $102,323.600 | $25,361.630 | $17.25 | 6 | $17.14334 | 0.148278700 | Hold |
| 101 | 04/19/1996 | $625,947.10 | $132,086.500 | $25,361.630 | $17.37 | 2 | $17.31000 | 0.084853410 | Hold |
| 102 | 04/22/1996 | $628,018.70 | $88,814.390 | $25,361.630 | $17.37 | 3 | $17.33000 | 0.069282520 | Hold |
| 103 | 04/23/1996 | $631,660.30 | $110,942.100 | $25,361.630 | $17.37 | 4 | $17.34000 | 0.060000420 | Hold |
| 104 | 04/24/1996 | $640,854.70 | $199,514.300 | $24,509.790 | $18.37 | 21 | $17.43190 | 0.312532000 | Sell 1,625 |
| 105 | 04/25/1996 | $643,493.40 | $117,726.200 | $24,509.790 | $18.75 | 2 | $18.56000 | 0.268700000 | Hold |
| 106 | 04/26/1996 | $643,751.00 | $94,553.590 | $24,509.790 | $18.50 | 2 | $18.62500 | 0.176776700 | Hold |
| 107 | 04/29/1996 | $645,201.50 | $108,020.500 | $24,509.790 | $18.12 | 4 | $18.43500 | 0.262614600 | Buy 833 |
| 108 | 04/30/1996 | $644,388.70 | $50,807.090 | $24,509.790 | $18.62 | 5 | $18.47200 | 0.242012100 | Hold |
| 109 | 05/01/1996 | $657,853.10 | $99,720.650 | $12,451.560 | $19.12 | 6 | $18.58000 | 0.341818600 | Sell 912 |

FIG. 13A-1

| | Trading Business Day | Return Dollar Value | Current Cash Reserve | Idle Uninvested Cash | Current Stock Price | Auto Sample Size | Current Mean Price | Current Standard Deviation | PV Recommended Action |
|---|---|---|---|---|---|---|---|---|---|
| 110 | 05/02/1996 | $648,402.10 | $39,426.110 | $12,451.560 | $19.37 | 2 | $19.24500 | 0.17677670 | Hold |
| 111 | 05/03/1996 | $648,329.30 | $75,066.910 | $12,451.560 | $19.50 | 2 | $19.43500 | 0.09192329 | Hold |
| 112 | 05/06/1996 | $649,700.10 | $98,855.650 | $12,451.560 | $19.37 | 3 | $19.41334 | 0.07505505 | Hold |
| 113 | 05/07/1996 | $647,699.80 | $50,045.390 | $12,451.560 | $19.00 | 5 | $19.27200 | 0.20510980 | Buy 754 |
| 114 | 05/08/1996 | $652,064.50 | $154,644.700 | $12,451.560 | $19.00 | 3 | $19.12333 | 0.21362010 | Hold |
| 115 | 05/09/1996 | $652,226.90 | $83,277.980 | $12,451.560 | $18.75 | 3 | $18.91667 | 0.14433760 | Hold |
| 116 | 05/10/1996 | $658,754.80 | $109,325.300 | $12,451.560 | $18.25 | 4 | $18.75000 | 0.35355340 | Hold |
| 117 | 05/13/1996 | $667,225.60 | $141,535.700 | $12,451.560 | $18.75 | 3 | $18.58333 | 0.28867510 | Hold |
| 118 | 05/14/1996 | $670,784.90 | $207,660.800 | $12,451.560 | $18.75 | 4 | $18.62500 | 0.25000000 | Hold |
| 119 | 05/15/1996 | $669,178.40 | $103,271.400 | $12,451.560 | $18.37 | 3 | $18.62333 | 0.21939260 | Buy 2,664 |
| 120 | 05/16/1996 | $668,286.40 | $78,098.940 | $12,451.560 | $18.62 | 2 | $18.49500 | 0.17677670 | Hold |
| 121 | 05/17/1996 | $670,948.20 | $130,127.700 | $12,451.560 | $19.37 | 9 | $18.76222 | 0.33899770 | Sell 3,168 |
| 122 | 05/20/1996 | $670,429.40 | $97,937.880 | $12,451.560 | $18.37 | 10 | $18.72300 | 0.34283290 | Hold |
| 123 | 05/21/1996 | $668,409.10 | $57,720.580 | $12,451.560 | $17.62 | 11 | $18.62273 | 0.46516840 | Hold |
| 124 | 05/22/1996 | $667,714.30 | $97,954.350 | $12,451.560 | $17.62 | 3 | $17.87000 | 0.43301270 | Hold |
| 125 | 05/23/1996 | $667,429.80 | $51,967.610 | $12,451.560 | $17.50 | 3 | $17.58000 | 0.06928252 | Buy 989 |
| 126 | 05/24/1996 | $666,090.40 | $217,303.700 | $12,451.560 | $17.37 | 2 | $17.43500 | 0.09192329 | Hold |
| 127 | 05/28/1996 | $663,181.90 | $62,419.420 | $12,451.560 | $17.75 | 5 | $17.57200 | 0.14342230 | Hold |
| 128 | 05/29/1996 | $660,957.80 | $30,718.540 | $12,451.560 | $17.62 | 2 | $17.68500 | 0.09192329 | Hold |
| 129 | 05/30/1996 | $665,430.30 | $38,443.320 | $12,451.560 | $17.75 | 3 | $17.70667 | 0.07505506 | Hold |
| 130 | 05/31/1996 | $676,822.30 | $154,132.200 | $10,474.930 | $17.62 | 3 | $17.66334 | 0.07505505 | Hold |
| 131 | 06/03/1996 | $670,842.20 | $67,167.290 | $10,474.930 | $17.50 | 2 | $17.56000 | 0.08485341 | Hold |
| 132 | 06/04/1996 | $669,314.00 | $31,026.450 | $10,474.930 | $17.50 | 3 | $17.54000 | 0.06928252 | Hold |
| 133 | 06/05/1996 | $668,103.50 | $26,839.200 | $10,474.930 | $17.50 | 4 | $17.53000 | 0.06000042 | Hold |
| 134 | 06/06/1996 | $653,148.90 | $51,288.000 | $10,474.930 | $17.12 | 12 | $17.53917 | 0.17201780 | Buy 358 |
| 135 | 06/07/1996 | $660,723.80 | $11,324.840 | $10,474.930 | $17.37 | 5 | $17.39800 | 0.16528730 | Hold |
| 136 | 06/10/1996 | $659,461.00 | $7,220.037 | $7,220.037 | $16.87 | 14 | $17.47928 | 0.24046300 | Hold |
| 137 | 06/11/1996 | $664,234.60 | $11,409.620 | $2,875.617 | $16.75 | 2 | $16.81000 | 0.08485341 | Hold |
| 138 | 06/12/1996 | $667,625.10 | $39,885.390 | $2,875.617 | $16.87 | 3 | $16.83000 | 0.06928252 | Hold |
| 139 | 06/13/1996 | $668,833.70 | $38,471.300 | $2,875.617 | $16.75 | 4 | $16.81000 | 0.06928252 | Hold |
| 140 | 06/14/1996 | $659,970.40 | $26,804.560 | $2,875.617 | $16.25 | 5 | $16.69800 | 0.25752700 | Buy 362 |

FIG. 13A-2

| | Trading Business Day | Return Dollar Value | Current Cash Reserve | Idle Uninvested Cash | Current Stock Price | Auto Sample Size | Current Mean Price | Current Standard Deviation | PV Recommended Action |
|---|---|---|---|---|---|---|---|---|---|
| 141 | 06/17/1996 | $656,550.60 | $10,357.580 | $2,875.617 | $16.12 | 2 | $16.18500 | 0.09192329 | Hold |
| 142 | 06/18/1996 | $647,612.10 | $8,412.814 | $2,875.617 | $15.25 | 3 | $15.87333 | 0.54372200 | Hold |
| 143 | 06/19/1996 | $649,445.60 | $9,253.024 | $2,875.617 | $15.63 | 2 | $15.44000 | 0.26870070 | Hold |
| 144 | 06/20/1996 | $648,939.80 | $22,713.300 | $1,519.805 | $15.75 | 2 | $15.69000 | 0.08485273 | Hold |
| 145 | 06/21/1996 | $645,841.60 | $24,370.340 | $1,519.805 | $14.25 | 4 | $15.22000 | 0.68088180 | Buy 456 |
| 146 | 06/24/1996 | $644,259.80 | $11,679.510 | $1,519.805 | $14.13 | 2 | $14.19000 | 0.08485273 | Hold |
| 147 | 06/25/1996 | $635,480.80 | $4,723.313 | $1,519.805 | $13.88 | 2 | $14.00500 | 0.17677670 | Hold |
| 148 | 06/26/1996 | $632,806.10 | $1,394.472 | $1,394.472 | $13.25 | 2 | $13.56500 | 0.44547740 | Hold |
| 149 | 06/27/1996 | $638,537.90 | $10,636.350 | $347.552 | $13.25 | 3 | $13.46000 | 0.36373070 | Hold |
| 150 | 06/28/1996 | $645,151.80 | $69,891.530 | $347.552 | $13.63 | 3 | $13.37667 | 0.21939320 | Hold |
| 151 | 07/01/1996 | $654,625.10 | $76,358.990 | $347.552 | $14.00 | 2 | $13.81500 | 0.26162940 | Hold |
| 152 | 07/02/1996 | $651,546.10 | $82,657.030 | $347.552 | $13.63 | 3 | $13.75333 | 0.21361950 | Hold |
| 153 | 07/03/1996 | $645,280.20 | $16,356.140 | $347.552 | $13.75 | 2 | $13.69000 | 0.08485273 | Hold |
| 154 | 07/05/1996 | $635,788.90 | $1,796.714 | $347.552 | $13.63 | 3 | $13.67000 | 0.06928197 | Hold |
| 155 | 07/08/1996 | $628,564.50 | $1,487.724 | $347.552 | $13.13 | 4 | $13.53500 | 0.27586220 | Buy 23 |
| 156 | 07/09/1996 | $631,060.10 | $1,894.784 | $347.552 | $13.13 | 3 | $13.29667 | 0.28867510 | Hold |

FIG. 13A-3

Visual ProVestment Exponential Method Test 19
with T-Distribution
Min | Max Sample Size > 2 | 90

| | |
|---|---|
| G_BuyDownLimit Control | 1 |
| G_BuyDownSample Control | 4 |
| G_Safety Control | 0.8125 |
| | |
| Concluding Business Day | 2,514 |
| Total Startup Funds | $640,000.00 |
| Number of Stocks in Portfolio | 32 |
| Funds per Stock | 20,000 |
| | |
| Total Shares Held in Portfolio | 268,289 |
| Total Buy Orders | 11,327 |
| Total Sell Orders | 6,300 |
| | |
| Maximum Shares held in portfolio | 327,154 |
| Average Stock Standard Deviation | 0.273639 |
| | |
| Usual Sample Size per Stock | 3.875 |
| | |
| Highest Return | 0.3768334 |
| Lowest Return | 0.1880481 |
| Usual Return | 0.2235332 |
| Concluding Return Factor | 31.21466 |
| Concluding Portfolio Risk | 0.273639 |
| | |
| Concluding Portfolio Value | $3,932,802. |
| Idle Uninvested Cash | $27.668 |
| Gain Divided by Stratup Funds Less Unused Cash | 6.145225 |
| | |
| Average Stock Risk within Portfolio | 0.273639 |
| Average Return to Risk | 10.14363 |
| Average Sharpe Ratio | 9.144456 |

FIG. 13B

SYSTEM AND METHOD FOR DETERMINING OPTIMAL INVESTMENT STRATEGY

CROSS-REFERENCE TO RELATED APPLICATIONS

This application claims the benefit of priority from U.S. Provisional Patent Application Ser. No. 60/864,124 (filed Nov. 2, 2006).

STATEMENT REGARDING FEDERALLY SPONSORED RESEARCH OR DEVELOPMENT

Not Applicable.

BACKGROUND OF THE INVENTION

This invention relates generally to portfolio management systems, the primary markets discussed in detail herein are the publicly-traded stock markets. However, the invention can be used to trade on other public markets (e.g., FOREX, commodities, options, etc.). Therefore, for the examples and discussion will use the U.S. publicly-traded stock market.

For many years, there have been two different schools of thought regarding stock market trading. The prevailing school preaches a detailed analysis of a company's financial reports and activities to determine an actual value of the shares of stock or Individually Traded Units (ITU) of the company. If the current market price of the company's total outstanding ITU's is lower than the computed actual value, then the ITU price will probably increase. If the current market price is higher, then the ITU price will probably decrease. This predictive technique is flawed in that the current market price is affected by many other factors such as supply and demand, world events, expected earnings vs. actual earnings, etc. The general worth of a broker that uses this school of thought is determined by his intuitive abilities to take all of these factors into account to attain more accurate predictions than his or her competition.

The second, and for many years the less prevalent school of thought preaches an analysis technique known as technical trading. Generally, technical traders perform very little analysis of the company's financial reports and activities. They watch the current market price with a given frequency in order to determine pricing trends. If the price of an ITU (correcting for minor fluctuations) has been increasing for a long time period in the past and into the present, then it will probably continue to increase for at least a short time period in the future. Conversely, a past long-term trend of decreasing prices tend to forecast a continuation of falling prices. For many years prior to the computer information age, technical traders would graph the stock prices for a given company over time. Most frequently, they would use the daily closing market price to plot discreet points on a graph. They would then plot trend lines in an effort to predict the future price of an ITU. FIG. 1 shows an upward price trend, while FIG. 2 shows a downward price trend. Note the use of the trend line to compensate for daily fluctuations. Technical traders would use these trend lines to predict the future price. Trend lines were used as a method of linearly "smoothing" the graph (i.e., disregarding pricing fluctuation over a long time period). Often the price graph would show familiar patterns. One such pattern is the "head and shoulders" illustrated in FIG. 3. Here, a series of upward and downward trends merge into a general upward trend to form a "head" and two "shoulders," and a downward trend develops from the second "shoulder." Typically, such a pattern results in a long-term downward trend during the time period following the formation of the second "shoulder." There is no logical reason for this to occur. However, past experience with this type of pattern provides a strong prediction for future pricing of the ITU. An entire repertoire of pricing patterns exist for the technical trader to use in order to predict future pricing.

For many years prior to the application of computers to technical trading, traders needed to be satisfied with ITU pricing sample points taken only from closing market prices. However, computer technology presented technical traders with the opportunity to sample pricing points much more frequently. Today, sampling intervals of minutes or seconds are used. The availability of the larger number of data samples permitted technical traders to develop sophisticated computer software to more accurately predict pricing trends. Based upon these trends, short-term recommendations could be made by technical trading brokers to customers to buy, sell, or hold a given stock.

Upon review of the existing state of the art as represented by issued patents and published applications it should be noted that computerized systems implementing investment strategies that analyze each separate stock within a portfolio to determine if the present trading price should be used to either buy, hold, or sell additional shares of that stock have been the subject of several earlier patent documents.

Of particular interest is the patent application publication US 2005/0154658 to Bove et al., which describes a system for automatic investment planning using a computerized scheme that automates investment planning for a client. In the scheme, data regarding the client's desired asset allocation, current asset portfolio and preferred domain (e.g., stocks, bonds, etc.) are input into a computer for processing. The data are used to automatically generate financial transaction recommendations for modifying the client's current asset portfolio to reach as close as possible, the desired asset allocation and the preferred domain. The generated recommendations include specific recommendations for selling amounts of selected current assets and specific recommendations for buying amounts of one or more investment funds. The recommendations are displayed on a summary report for review by the client or the client's financial manager, or the recommendations are electronically communicated to a trade execution computer which automatically performs the necessary transactions to execute the buy/sell recommendations. The recommendations are selected in a manner which minimizes the tax impacts and transaction costs of potential sell transactions.

Furthermore, the U.S. Pat. No. 6,484,152, issued to Robinson, shows a method of automatically selecting a securities portfolio from a plurality of securities, selecting investment characteristics and investment limits considered important for investment objectives. The method establishes a safety level for the portfolio constructing a matrix having entries corresponding to: (a) the selected characteristics and limits; and, (b) the candidate securities; thereby establishing an objective function corresponding to the constructed matrix and then determining the securities portfolio based on the matrix and the objective function. The investment characteristics may include dividends, rate of growth of earnings, financial strength, safety, predictability of earnings, and performance rankings provided by an advisory service. The safety level may be provided by determining a number of different stocks to be included in the specific portfolio. The selected investments may be determined by limitations imposed on the amount of investment in each candidate security. At least one selected investment limit may relate to a standardized commercial rating or a measure of financial strength.

In addition, the patent application publication US 2005/0234809, issued to Criner, describes a method that, given a price-time trajectory, seeks the policies that optimize portfolio performance over that trajectory. The method is based on the result of a program of research that succeeded in portfolio optimization. A controlled theoretic approach included: 1) developing a measure of profitability of the trading portfolio; 2) computationally modeling the trading process operating on the price-time histories; 3) calculating estimates of the price-time histories using functions with well-known mathematical characteristics; 4) calculating, using the calculated estimates, derived functions of the price-time histories about which control variables are known and about which there is prior knowledge; and 5) simulating, using the derived functions, the trading policies and seeking the values of the control variables that maximize the portfolio's trading performance over the life of the trades.

The above-listed references were selected to illustrate patent documents in the field of formula investment strategies that analyze each separate stock within a portfolio to determine if the present trading price should be used to determine whether to: buy, hold, or sell additional shares.

SUMMARY OF THE INVENTION

The Present Invention is a computer program which performs analysis on a portfolio of Individually Traded Units (ITU) which for purposes of this discussion are best thought of as publicly traded stocks. But they could be any publicly traded entity (stock options, commodities, mutual fund shares, index funds, etc) provided that there is timely and publicly available price data for each ITU. For the purposes of this write-up and familiarity with the terms in use, the invention will be discussed from this point on using normal stock market terminology (stock portfolio, individual stock, shares held, price quote, "buy/sell/hold", etc.).

More specifically, the invention uses an artificially intelligent expert system to analyze each separate stock within a given portfolio to determine if the currently reported trading price of the stock should be used to buy, hold, or sell shares. To make this decision, the software derives the current moving mean, exponentially smoothed average, variance, and standard deviation based on the current calculated optimum sample size. When the current trading share price of an active stock within the portfolio increases by more than one standard deviation greater than the moving mean, and the trading price is greater then both the exponentially smoothed average and mean cost to acquire the stock; then the difference is used to calculate a transaction (number of shares and share price) to recommend that the user sell a specific number of shares based on the difference calculation. However, if the price were to fall below the current mean minus one standard deviation and fall below the exponentially smoothed average, the system then analyzes the difference and recommends that the user buy a specific number of shares (at a specific share price) that directly relates to the difference calculation.

The invention also immediately processes and adjusts for "stock splits" and unusual market activity (e.g., the "market collapse" resulting from the events of Sep. 11, 2001).

The computer program simply executes a main program "loop" through each of the stocks in the user's portfolio (total collection of different stocks) calling in sequence various functions (i.e., "subroutines") which assist in the calculation of certain statistical properties of each stock in the portfolio. Based on these statistical properties a two-part decision is made: first, to buy, sell, or hold the particular stock and if buy or sell how many shares at a given price.

Experimentation has shown that this computer program predicts ITU pricing trends with very high accuracy. The recommendations to buy, sell, or hold specific stocks within a given portfolio have proven to be valid over a wide range of securities.

BRIEF DESCRIPTION OF THE DRAWINGS

FIG. 13A-1 is a printout of the first part of a spreadsheet produced by the present invention;

FIG. 13A-2 is a continuation of the printout shown in FIG. 13A-1;

FIG. 13A-3 is a continuation of the printout shown in FIG. 13A-2.

FIG. 13(B) is a further printout of the spreadsheet of FIG. 13A-1.

Similar reference characters denote corresponding features consistently throughout the attached drawings.

DETAILED DESCRIPTION OF THE PREFERRED EMBODIMENTS

Flowcharts of the entire software system are shown in FIGS. 4 through 12, and are divided into principle modules. Commented pseudo-code for all the modules is shown in the Appendix. The Appendix sections are divided into modules, and they have the same designations as the figures corresponding to those modules.

The program comprises a MAIN program that initializes itself by clearing certain control variables and retrieving from an appropriate source(s) the current price for each different issue in the portfolio (it is assumed for purposes of this discussion that these are the current ASK price on the U.S. exchanges, e.g., NASDAQ, NYSE and AMEX). The primary storage media for all this stock related data can be a Microsoft Excel spreadsheet. Portions of a sample spreadsheet are shown in FIG. 13.

Figure 4:
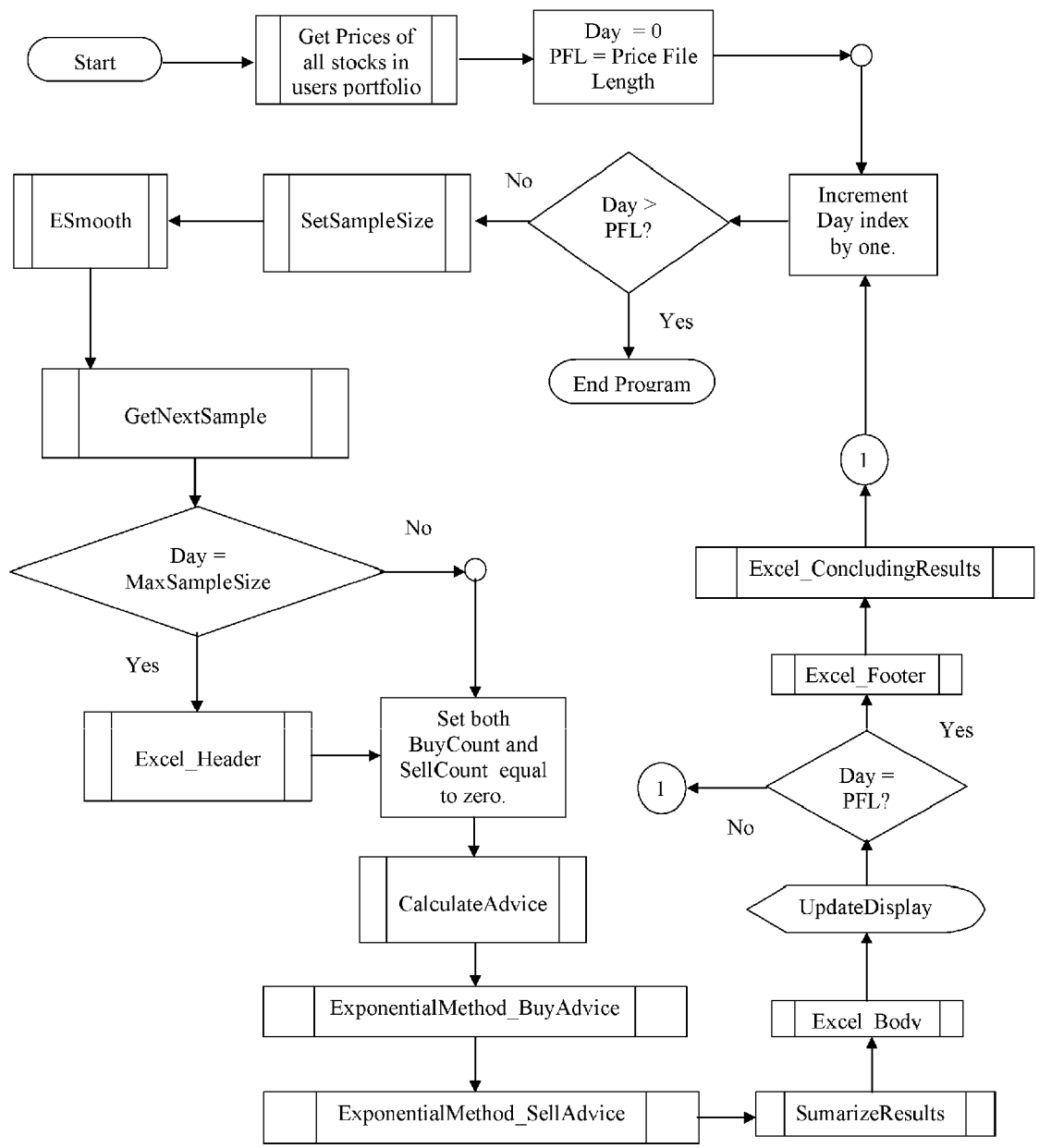
FIG. 4 is a flowchart of the MAIN processing routine.
Figure 10A:
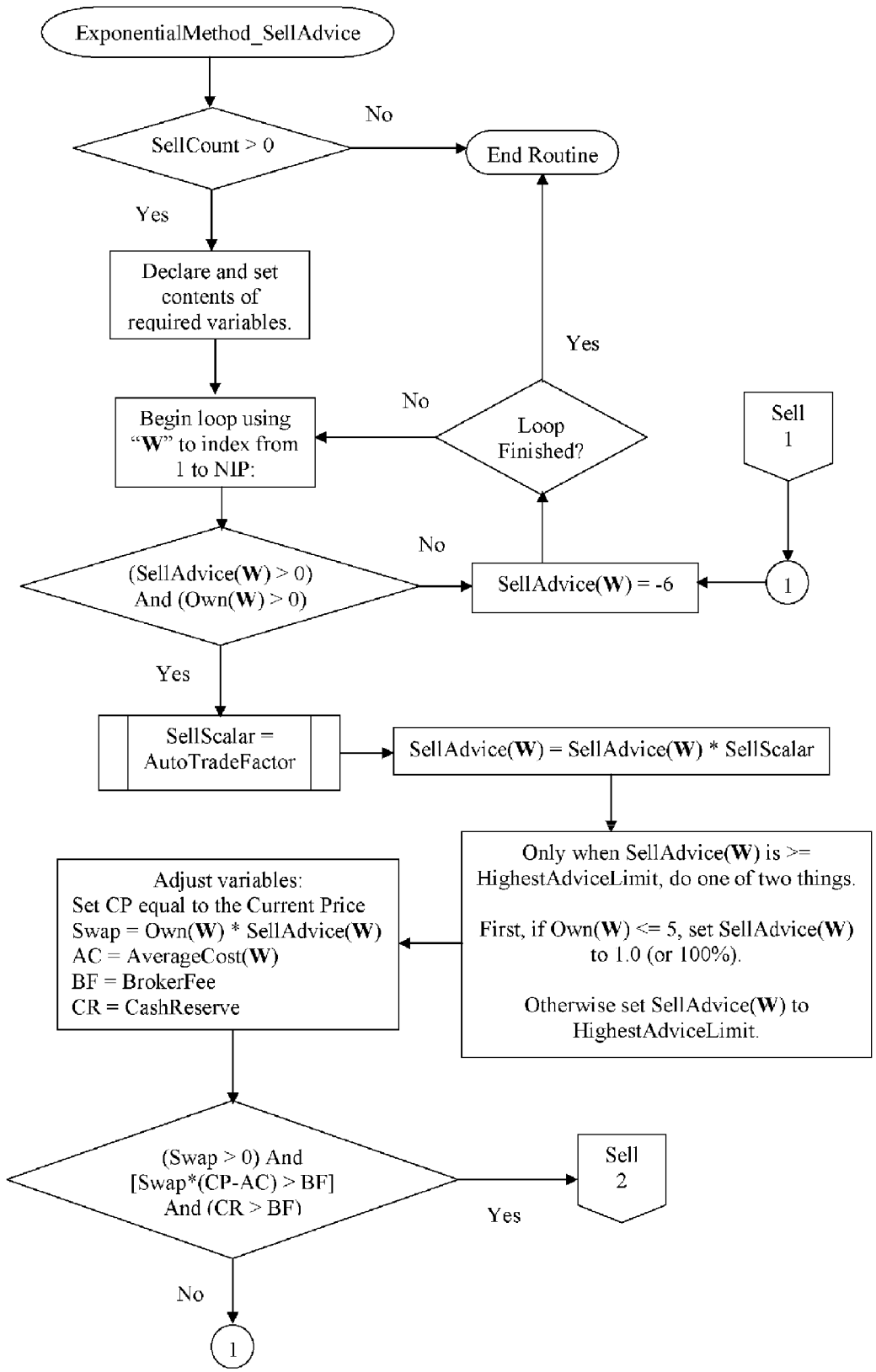
FIG. 10(A) is the first part of the SELLADVICE flowchart.
Figure 10B:
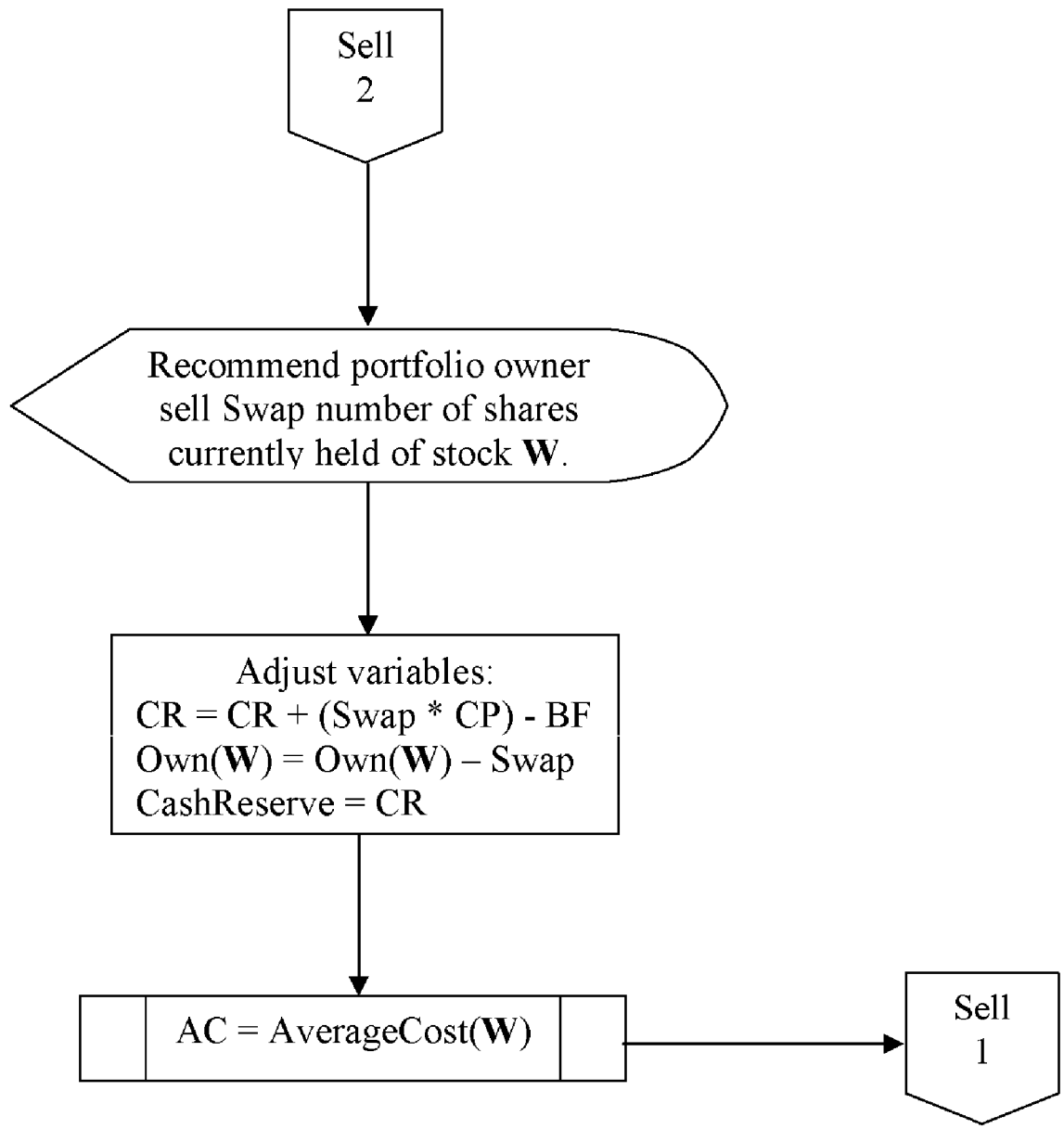
FIG. 10(B) is the second part of the SELLADVICE flowchart.

After initialization and loading of stock price data into the spreadsheet, the MAIN program comprises of a simple loop that passes through the users portfolio starting with the first stock and proceeding to the last stock in the portfolio, and performs the calculations necessary to determine a decision for that particular time period (i.e., end-of-day) whether to buy, sell, or hold that stock as well as a recommendation of the number of shares to buy or sell at the quoted (i.e., retrieved) price. FIG. 4 represents the flowchart for the MAIN program, and the code with comments for the MAIN routine is shown in the Appendix for FIG. 4. The principal sub-functions are:

CalculateAdvice (shown in FIG. 7),
ExponentialMethod_BuyAdvice (shown in FIGS. 9A and 9B), and
ExponentialMethod_SellAdvice (shown in FIGS. 10(A) and 10(B).

The steps that are performed by the MAIN routine after the price data has been loaded consist of looping thru the following series of functions (For Z=1 to NIP, where NIP stands for number of stocks in portfolio, and CP stands for Current Price):

A. SetSampleSize (Refer to FIG. 5)

Figure 5:
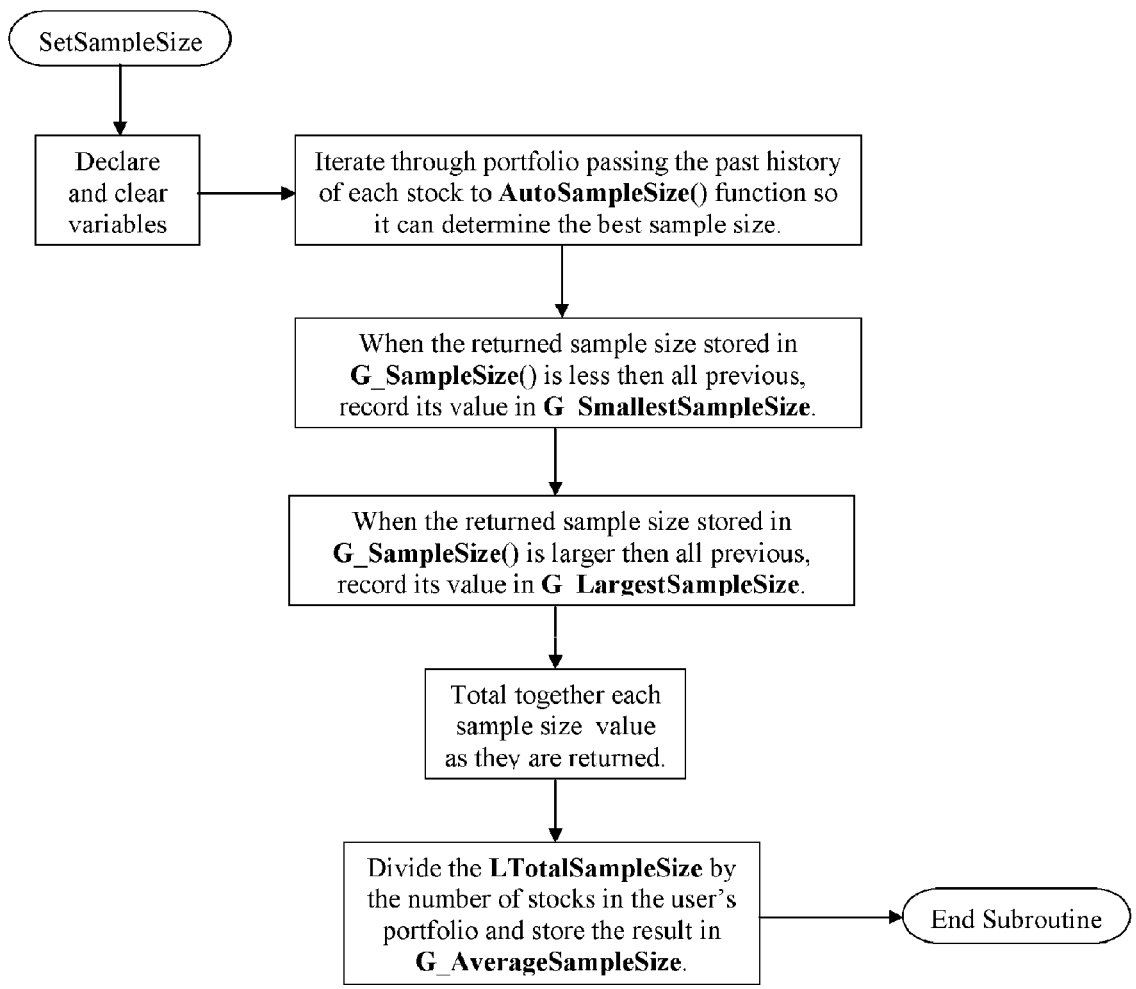
FIG. 5 is a flowchart of the SETSAMPLESIZE subroutine.
Figure 5A:
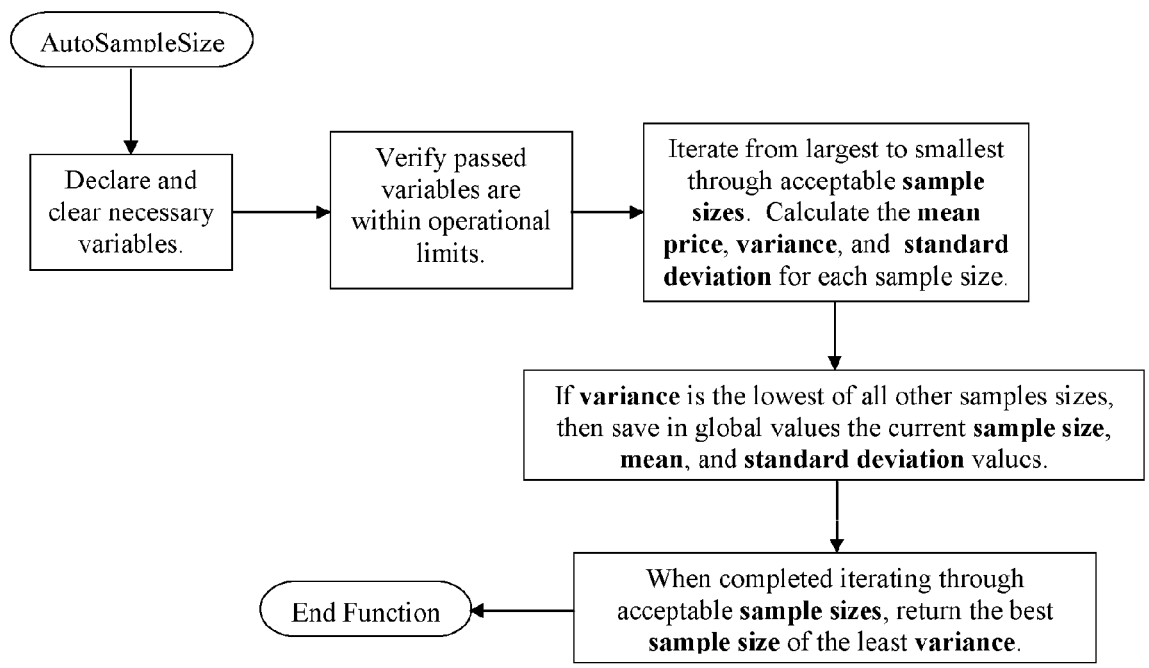
FIG. 5(A) is a flowchart of the AUTOSAMPLESIZE function.
Figure 6:
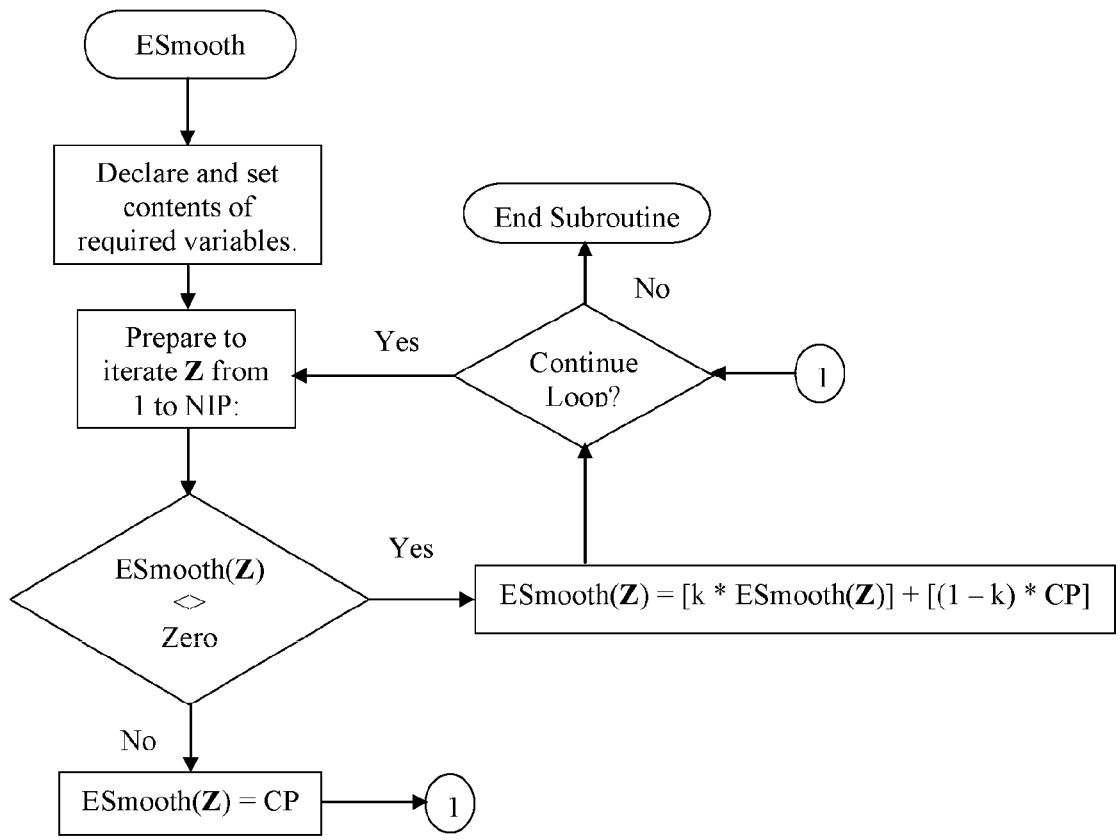
FIG. 6 is a flowchart of the ESMOOTH subroutine.
Figure 7:
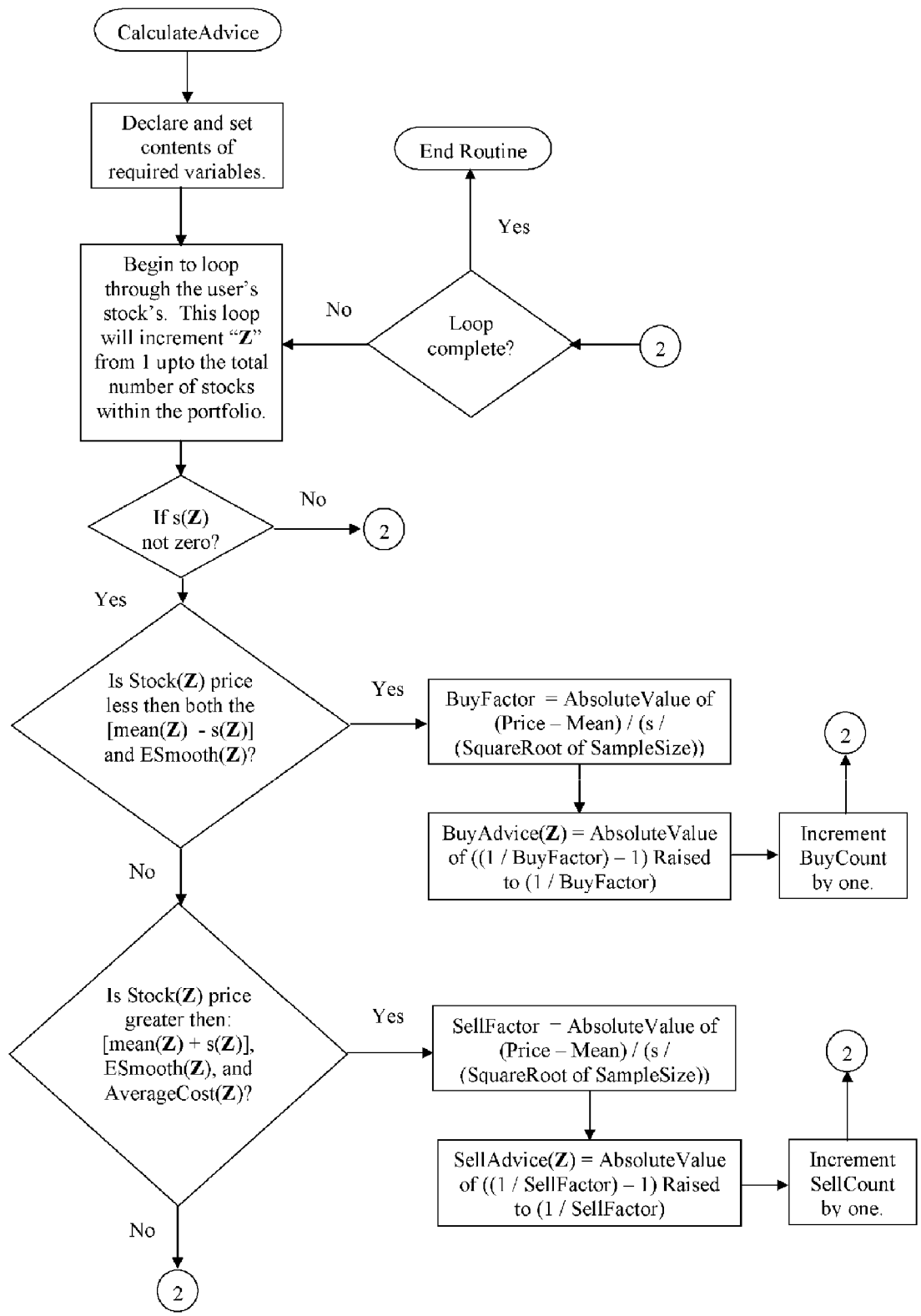
FIG. 7 is a flowchart of the CALCULATEADVICE subroutine.
Figure 8:
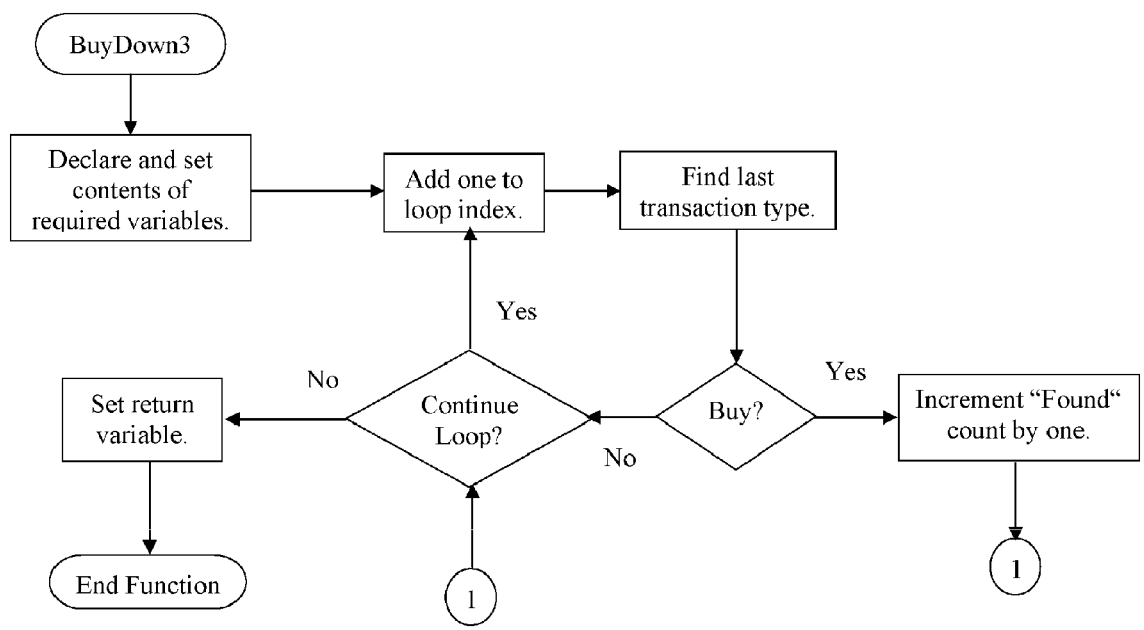
FIG. 8 is a flowchart of the BUYDOWN3 function.

This routine invokes a function called AutoSampleSize (shown in FIG. 5(A)) that determines the best sample size for a particular stock's latest sample set of prices. The determined sample size is stored in an array G_SampleSize(Z) which is the $Z^{th}$ stock in the user's portfolio. The number of stocks in the user's portfolio varies from 1 to NIP, which is a global variable which is an acronym for Number In Portfolio. The smallest and largest sample sizes in the entire portfolio of stocks are maintained in G_SmallestSampleSize and G_LargestSampleSize.

1. AutoSampleSize (Refer to FIG. 5(A))

This sub-function determines the "best" sample size to use for all calculations relating to this individual stock. The determination is made by calculating three (3) moving statistics: mean, variance, and standard deviation for the stock price over the range from G_MaxSampleSize stepping down to G_MinSampleSize and determining for what sample range its variance is the lowest. The sample size with the lowest variance, yet greater than zero, is defined to be the "best" sample, based on the rationale that the least variance represents the smallest difference between the members of the sample and its current moving mean. G_MeanPrice(Z) and G_Deviation(Z) can then be set to the calculated moving mean price and the calculated moving standard deviation for this stock using the best sample. The formulas for these calculations are well known in the art.

B. ESmooth

This function calculates an "exponentially smoothed" value of the price for each stock in the current portfolio. The current smoothed value (ESmooth(Z)) is checked to determine if it is equal to zero in which case, it is blank and not used, therefore the smoothed value for that stock is set to the current day's price. If the current smoothed value is not zero, the new smoothed value is calculated as:

$$ESmooth(Z)=[k \times ESmooth(Z)]+[(1-k) \times CurrentTradingPrice]$$

where k=0.7

C. CalculateAdvice

This subroutine creates the actual recommendation (Buy/Sell/Hold) for each stock within the user's portfolio by iterating through a loop from 1 to NIP (the number of stocks in the user's portfolio).

The recommendation is based on a set of tests, starting with the "Buy" test, and if that is false, proceeding to the "Sell" test, and finally if neither is true, defaulting to the "Hold" status. If a buy or sell recommendation is made, the routine calculates the percentage of the holding which should be bought or sold and stores it as a decimal number in G_BuyAdvice(Z) or G_SellAdvice(Z), where again Z is an index to the stock entry in the user's portfolio.

The test for "Buying" is whether the current stock price is less than the mean price (G_MeanPrice(Z)) minus the standard deviation of the price (G_Deviation(Z)) and the current price is less than or equal to the exponentially smoothed price for the stock (G_ESmooth(Z)). This second test is an assurance against an incorrect sample size since the smoothed price is independent of sample size and only determined by the value of "k"; also, this second test will decrease the influence of older prices in an exponential manner.

If either test for buying is false, then the "Sell" test is performed. The sell determination involves three conditions versus the two in the buy test. The current stock price is greater than the mean price (G_MeanPrice(Z)) plus the standard deviation of the price (G_Deviation(Z)) and the current price is greater than or equal to smoothed price for the stock (G_ESmooth(Z)) and the current price is also greater than G_AC(Z), which is a portion of the Broker's fee plus the share price paid. This last test is to assure that the selling price is profitable, i.e., greater than the current average cost of acquiring the shares [(total price for shares+broker's commission)/shares bought].

Both Buy and Sell use a positive, absolute value, version of the Student's t-distribution (Equation 3 below)

$$LBuyFactor=Abs(LCP-G\_MeanPrice(Z))/[(G\_Deviation(Z)/Sqrt(G\_SampleSize(Z))]$$

When sample sizes are less then 30 elements, the student's t-distribution will function in place of the Z-score and used as the index root. For example:

$$|(1/|t|)-1|^{\wedge}(1/|t|)$$

$$G\_BuyAdvice(Z)=Abs((1/LBuyFactor)-1)^{\wedge}(1/LBuyFactor)$$

which is the same formula as:

$$G\_BuyAdvice(Z) = \sqrt[|t|]{\left|\left(\frac{1}{|t|}\right)-1\right|}$$

LBuyFactor is a single precision, floating point variable
LSellFactor is a single precision, floating point variable
LCP is the current price of the stock (at location Z in the user's portfolio) under consideration
G_MeanPrice(Z) is the mean price of the $Z^{th}$ stock (determined using G_SampleSize(Z)).

The absolute value of the conventional Student's t-distribution will result in values which could take on any value, but potentially greater than 1.0 and less than 0.0 are not of interest and are useless. These values (=>1 and <=0) would be useless as a percentage of the current shares held to be bought/sold. The Student's t-distribution is significant, and therefore utilized because it represents the deviation of the individual price from the standard deviation. In order to utilize the Student's t-distribution, to generate a trading percentage, it should be transformed into a value between (but not equal to) 0 and 1. The transform used by CalculateAdvice is determined as:

$$G\_BuyAdvice(Z)=Abs((1/LBuyFactor)-1)^{\wedge}(1/LBuyFactor)$$

$$G\_SellAdvice(Z)=Abs((1/LSellFactor)-1)^{\wedge}(1/LSellFactor)$$

and results in a value for G_BuyAdvice(Z) or G_SellAdvice(Z) in the proper range (0<X<1) which is then used as the percentage of the current holding to Sell or of available cash reserve to buy.

In order to keep a running count of the number of buys and sells the two counters: G_EMBuyCount and G_EMSellCount, are both initially set equal to zero and only incremented by one in an appropriate manner.

NOTE: At the conclusion of the major loop in CalculateAdvice (1 to NIP) each of the stocks will have an associated determination whether to buy, sell, or hold. If it is to buy or sell, a decimal percentage of current holdings is recommended. However, this only represents the first step of the process. What remains is to determine from all of the recommendations for the entire portfolio and the available cash what portion of each buy recommendation to actually execute. If the recommendations are just processed sequentially the earliest portfolio members will consume most of the available cash and the later members may have significantly limited cash available to acquire what may turn out to be excellent investment choices. Therefore all of G_BuyAdvice array should be examined in order to make an appropriate and more reasonable set of buy choices. Further analysis of the set of buy recommendations is done by the routine ExponentialMethod_BuyAdvice (shown in FIGS. 9A and 9B) The results yield approximately the same amount of available cash to be used for each individual "buy" (depending on the shares to be purchased and the price).

D. ExponentialMethod BuyAdvice (Refer to FIGS. 9A and 9B)

After determining if there are stocks for which a "buy" is recommended (G_EMBuyCount>0) and that a crisis (like Sep. 11, 2001) has not caused a market plunge (tested by dividing the number of buy recommendations (G_EMBuyCount) by the number of issues in the portfolio (NIP) and seeing if that result is greater than the "G_Safety" a constant set by the user, a medium safety limit would be from 0.3 to 0.7) the normal processing can proceed.

A loop is executed through the entire portfolio in order to determine the stock with the lowest recommended purchase percentage. This is performed to allocate cash first to those stocks whose purchase price has changed the least and therefore are assumed to require the least attention. The purpose for doing this is so that the portions of each that are not used can be saved for those stocks with larger, thus more urgent, purchasing advice.

Before a buy can be made, certain "safety checks" are made throughout this routine. The primary check is to insure that the current price is not exceptionally low (a severe drop) by comparing it to a user defined variable if the default of 75% of the mean price as a lower limit. A value of 75% is used here as an example value to represent the user's choice, which is stored in a variable called "LBuyBarrierWarning".

Figure 9A:
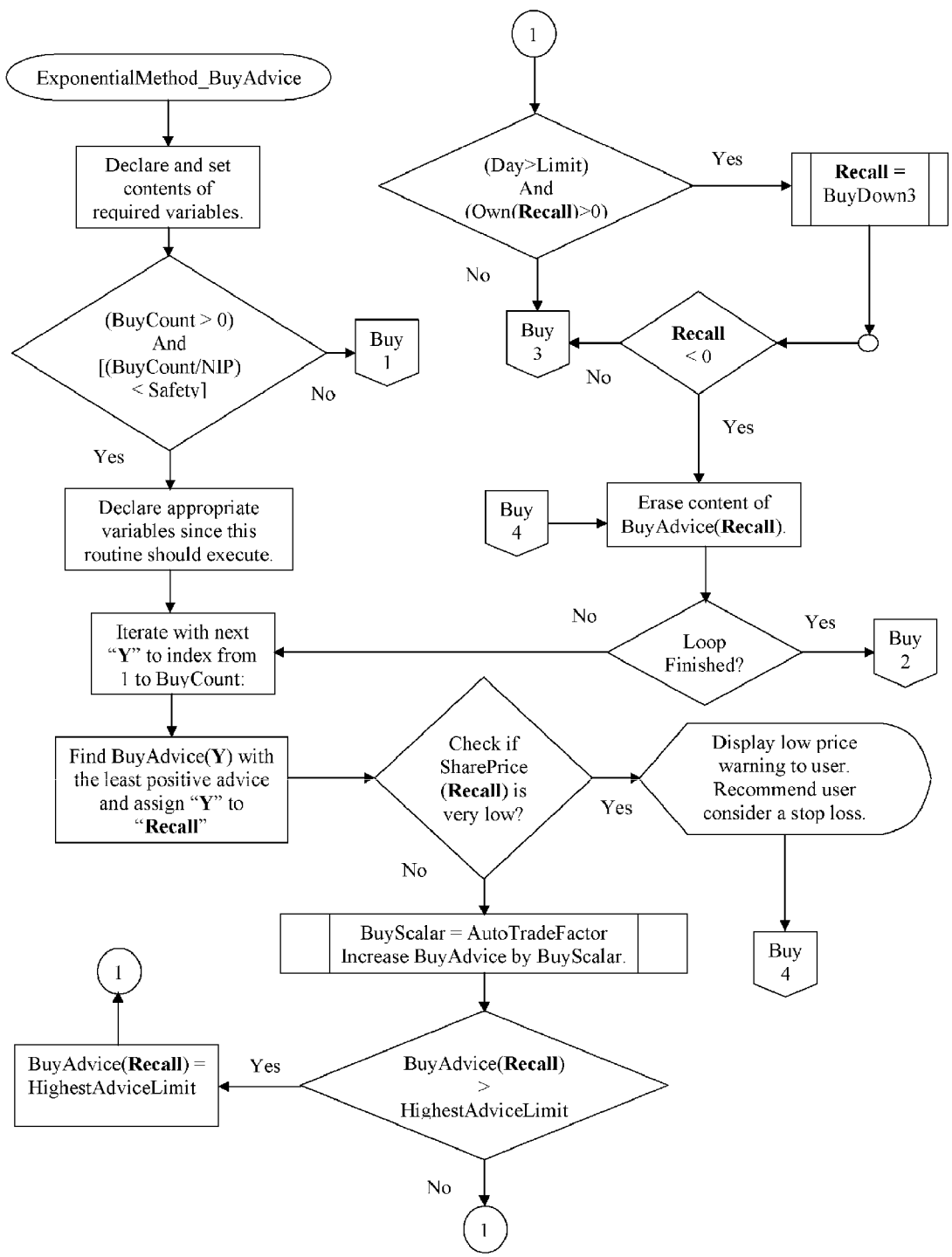
FIG. 9(A) is the first part of the BUYADVICE flowchart.
Figure 9B:
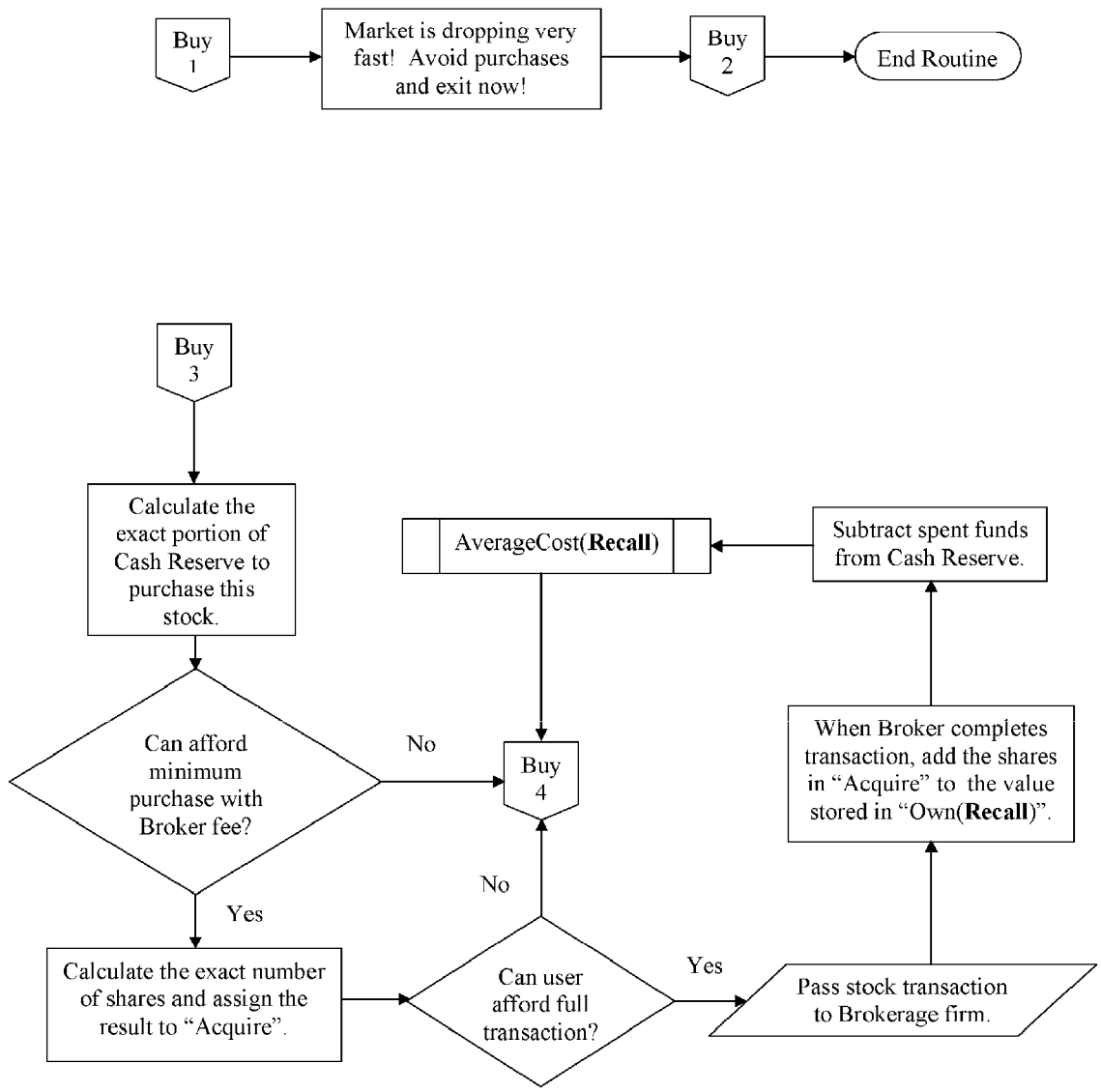
FIG. 9(B) is the second part of the BUYADVICE flowchart of FIG. 9(A).
Figure 9C:
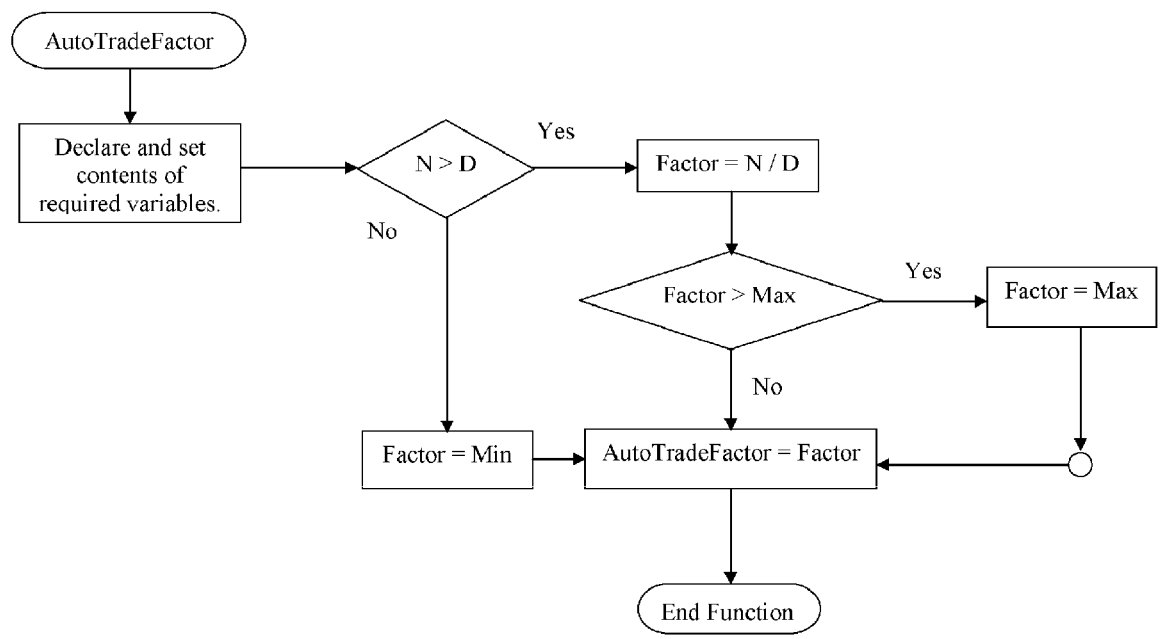
FIG. 9(C) is a flowchart of the AUTOTRADEFACTOR function.

Normal processing of a buy order comprises invoking the AutoTradeFactor function (see FIG. 9(C)) which returns a decimal value that is applied (multiplied) to G_BuyAdvice in order to adjust it based on the amount of unused cash. A second safety check is done here to insure that the value of G_BuyAdvice does not exceed a preset maximum value (G_HighestAdviceLimit), if it does then the G_HighestAdviceLimit is used as the value for G_BuyAdvice.

Before the "buy" can be approved, a check is made to determine if the stock is in a temporary downward trend, indicating that buying should be avoided until the trend bottoms out. This check is made by the function BuyDown3 (refer to FIG. 8) which will return a value unchanged (i.e., not negative) if the past history contains less then a specified number of "buys" (parameter passed to function) over a user specific past sample size (G_BuyDownSample). Conversely, if there are equal to or greater then the specified number of "buys", the value of BuyDown3 is set to a negative number indicating to the calling routine to skip that recommended purchase.

If the "buy" is to proceed normally, the amount of available funds for the buy is computed by dividing the available cash (G_Cash) by a denominator equal to 2+the remaining number of "buys" to be processed. The slightly increased denominator (by 2) assures that exactly all of the available funds will not be allocated to only the current "buys". Before the "buy" transaction proceeds to be approved, a check is made to assure that there are enough funds left (LSegmentedFunds) to cover the purchase of a single share plus any broker's fees (G_Broker). The number of shares, as an integer value, to acquire (LAcquire) is then computed with these two formulas:

$$LSegmentedFunds = G\_Cash/(2 + G\_EMBuyCount - Y)$$

$$LAcquire = Int([LSegmentedFunds * G\_BuyAdvice (LRecall)]/LCP)$$

The available cash is updated by deducting the cost of this buy ([Shares*Price] plus Broker's fee) and the remaining housekeeping (updating of totals, etc.) is performed prior to conclusion of this routine.

1. BuyDown3 (Refer to FIG. 8)

This function counts backward from the current day, and determines the segment of the past transactions (until either G_BuyDownSample is completed or G_BuyDownLimit number of buys has been found) are "buys". If there are equal to or more "buys" then the G_BuyDownLimit specifies, a negative value is returned back to the calling statement. This negative return signals its calling statement not to buy because of a declining market. If there are not many "buys", it returns a positive result indicating to proceed with the current buy transaction.

2. AutoTradeFactor (Refer to FIGS. 9(A) Through 9(C))

Figure 11:
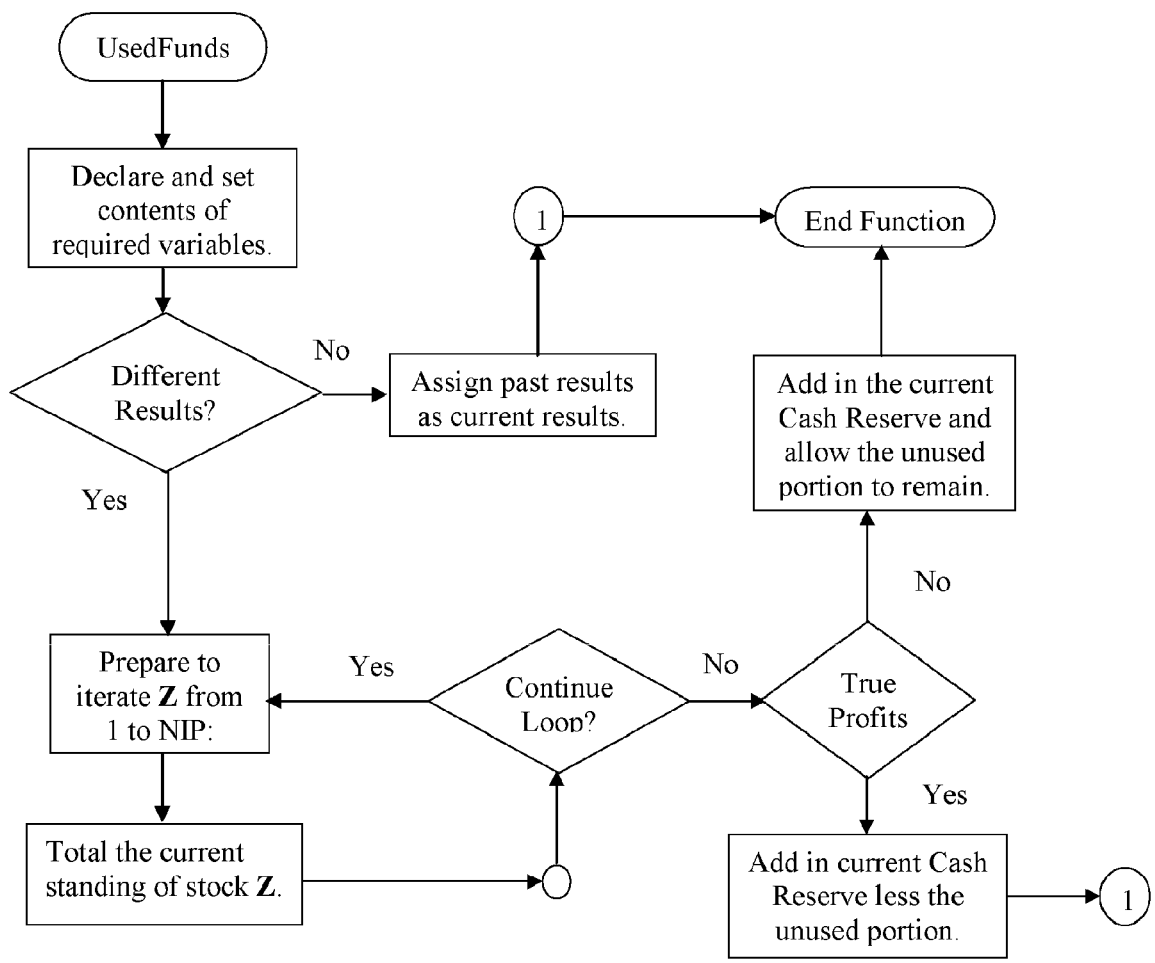
FIG. 11 is a flowchart of the USEDFUNDS function.
Figure 12:
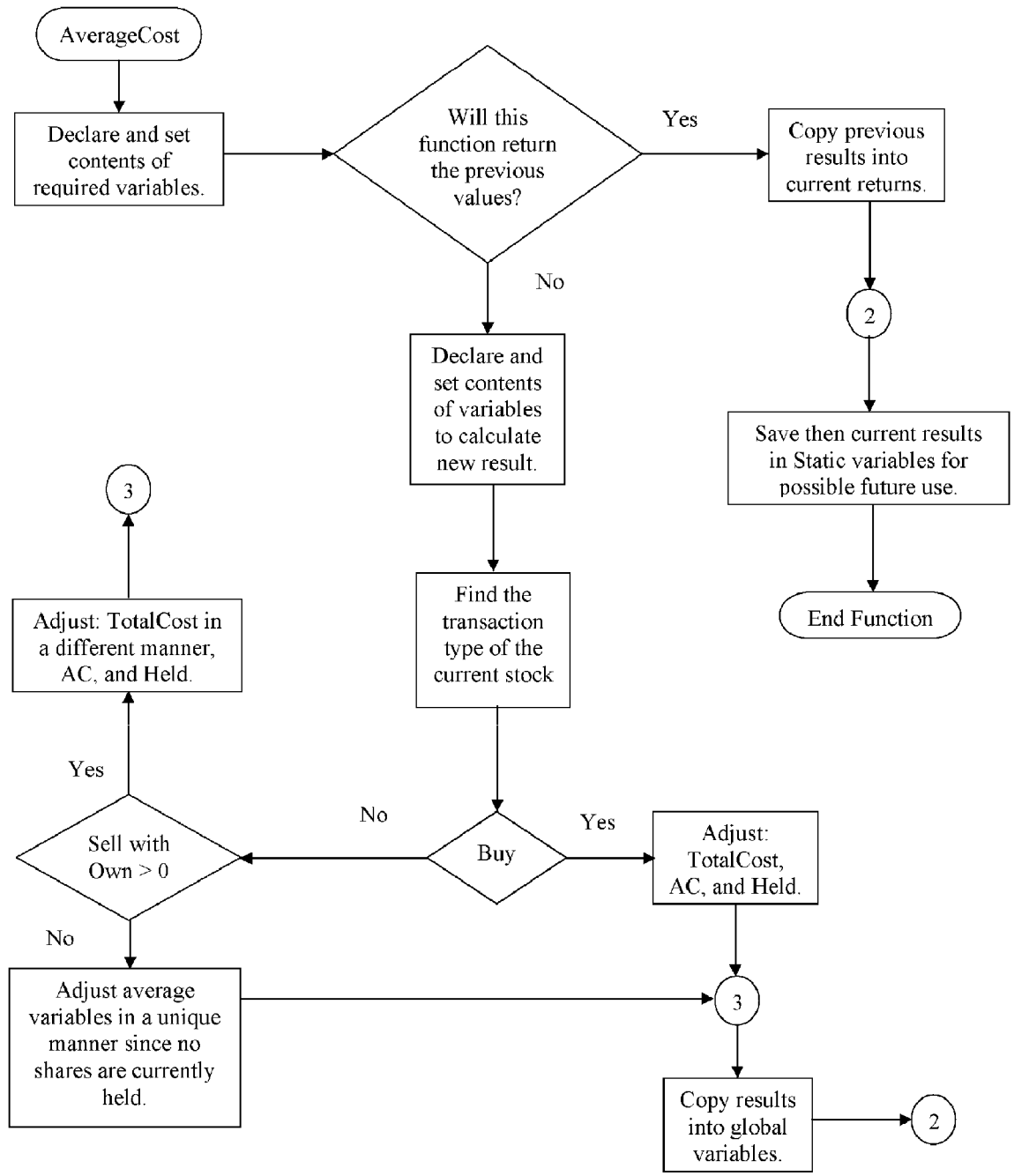
FIG. 12 is a flowchart of the AVERAGECOST function.

This function returns a value which is used to adjust the percentage of the current position to buy (G_BuyAdvice) based on G_Cash after calling the function UsedFunds (see FIG. 11). The returned value will equal the ratio unless it exceeds certain prescribed limits $$(LMaxLimit >= AutoTradeFactor >= LMinLimit)$$

in this version of the pseudo-code the max is 4.5 and the min is 1.0. Yet both LMaxLimit and LMinLimit can be user specified.

3. UsedFunds (Refer to FIG. 11)

This function determines the current value of the entire portfolio while utilizing a Boolean parameter which indicates if the true "profit" should be returned to the calling routine or not. If profit is requested, the value G_UnUsedCash is subtracted from the total value before returning. If "profit" is not the desired result (whereby the Boolean parameter's value=False), then G_UnUsedCash is not subtracted.

E. ExponentialMethod SellAdvice (Refer to FIGS. 10(A) and 10(B))

The routine first verifies that there are recommended sell transactions to be processed by checking to see if G_EMSellCount is greater than zero. A loop passing through the entire portfolio (from 1 to NIP) looks at each entry to determine if G_SellAdvice(Z) is >0 and that the user owns some shares of the stock (i.e., G_Own(Z)>0).

The number of shares to be sold is determined in two steps. First, the AutoTradeFactor function is called to generate a value for G_SellScalar and G_SellAdvice(Z) is then multiplied by G_SellScalar; the result is an adjusted percentage of shares to be sold. A test is made to determine if there are only a small number of shares owned (G_Own(z)<=5) in which case they are all sold by setting G_SellAdvice(Z) to 1.0 (100%). If more than a few shares are held, a second test is made to assure that not too many shares are sold by comparing G_SellAdvice(Z) to a constant (G_HighestAdviceLimit) used to prevent excessively large orders from being placed and thereby skewing the portfolio towards certain issues. Otherwise the new calculated value of G_SellAdvice(Z) is used to calculate LSwap the integer number of shares (out of G_Own(Z)) to be sold.

$$LSwap=Int(G\_Own\,(Z)*G\_SellAdvice\,(Z))$$

LSwap is the number of shares to be sold.
G_Own(Z) is the number of shares currently held by the user.

Before the sell order is made the following tests are performed: first, the number of shares (LSwap) has to be >0; and then, the profit to be made on the sale is >the Broker's fee; and finally, the cash on hand (G_Cash) is >the Broker's fee. If these tests are all successful (true), then the sale is placed by notifying the user or brokerage firm via a outputted message or a spreadsheet.

The final step in the loop's processing is to update the various variables (G_Cash, G_Own(Z), G_AC(Z), and G_EMSoldCount) based on the agreed upon sale. The variable G_AC(Z) is calculated by the function AverageCost.

1. AverageCost (Refer to FIG. 12)

This function calculates the average cost of the $Z^{th}$ stock in the portfolio. If this routine was used recently with identical parameters, to save processing time, it will return the previously calculated value. The average cost is based on the transaction type: if a "buy" order were completed, then the total cost is based on the total amount formerly paid for the shares held of that stock (G_TotalCost(Z)) plus the shares traded or those now acquired (LST) times the current price (LCP) in addition to the Broker's fee (G_Broker); which is then divided by the number of shares (G_Own(Z)) held post the completion of this purchase transaction.

If the transaction type was a "sell", then the total cost is based on the former average cost (G_AC(Z)) immediately prior to this transaction completion times the number of shares held (G_Own(Z)) plus the Broker's fee, which is then divided by the number of shares (G_Own(Z)).

F. SummarizeResults

This is a function that will calculate and adjust the values to be displayed. Note that this comment also applies to "T19.UpdateDisplay".

G. Excel_Body

Figure 1:
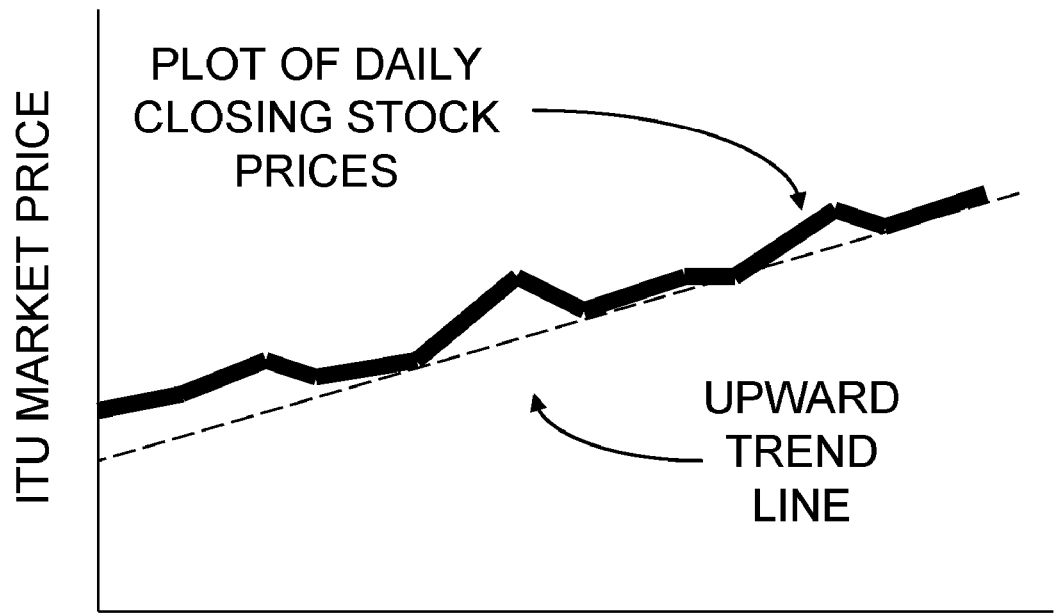
FIG. 1 illustrates how an upward trend line is created from rising stock prices.
Figure 2:
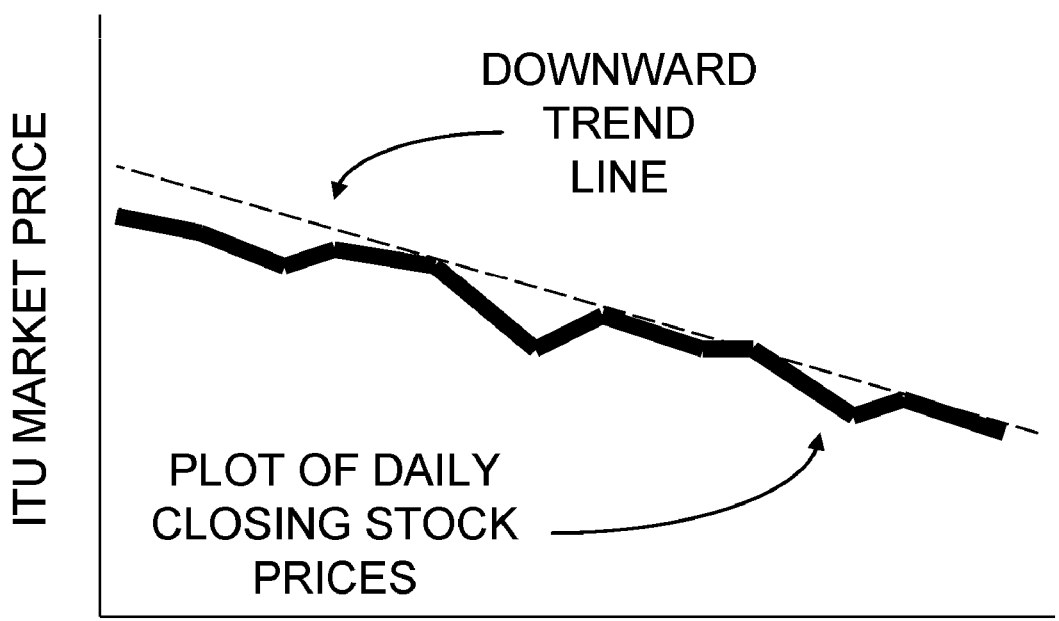
FIG. 2 illustrates how a downward trend line is created from falling stock prices.
Figure 3:
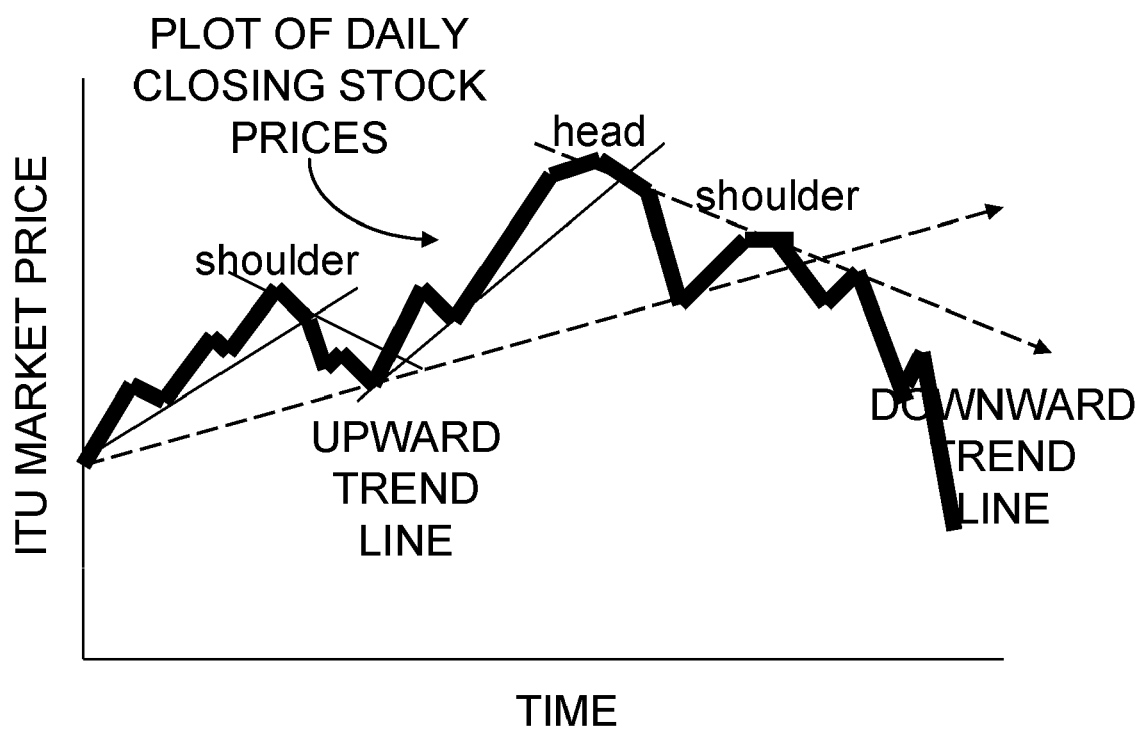
FIG. 3 illustrates a "head and shoulders" as a typical pattern used to predict future stock prices.

See FIG. 13A-1 through FIG. 13A-3.

H. T19.UpdateDisplay

See SummarizeResults above.

I. Footer

J. Excel_ConcludingResults

See FIG. 13(B).

It is to be understood that the present invention is not limited to the embodiments described above, but encompasses any and all embodiments within the scope of the following claims.

I claim:

1. A computer implemented method for determining whether to buy, sell, or hold a specific Individually Traded Unit (ITU) of publicly traded units residing in a securities or investment portfolio owned or controlled by a user, wherein the portfolio comprises of at least the trading statistics of each ITU, said method comprising:

a) selecting the specific ITU for analysis and providing an average purchase price paid by the user for the selected ITU;
b) receiving a sequence of current market prices of the ITU over a desired time period;
c) sampling prices from the sequence of market prices at desired time intervals;
d) calculating an exponentially smoothed average of the sampled prices;
e) calculating a current moving mean value for the sampled prices; and
f) performing a variance and a standard deviation analysis of the moving mean, wherein at least steps (c) through (f) are performed by a computer,
whereby,
if the current market price of the selected ITU within the portfolio increases by more than one standard deviation greater than the moving mean, and greater than or equal to the exponentially smoothed average, and greater than the average purchase price paid for the selected ITU then estimate a sell advice value for each selected ITU and calculate an optimum number of ITU's shares to sell at current market price and recommend that the user sell the optimum number of ITU's, wherein the optimum number of ITU's to sell is determined by multiplying the number of ITU stocks within each selected ITU by the sell advice value for each selected ITU,
else if the current market price of the selected ITU within the portfolio decreases below the current moving mean value minus one standard deviation, and decreases below or equal to the exponentially smoothed average then calculate an optimum number of additional ITU's to buy at the current market price and provide a buy recommendation to the user to buy an optimum number of ITU's, wherein the optimum number of ITU's to buy is determined by: (1) checking amount of cash available for purchasing ITU stocks, (2) segmenting the cash available to provide a segmented fund for each recommended ITU stock purchase, and (3) calculating the number of ITU's to buy according to the product of segmented funds and the strength of the buy recommendation divided by the current market price of the ITU stock,
else recommend that the user neither buy nor sell any of the selected ITU's.

2. The method of claim 1 further comprising calculating the number of sampled prices to comprise an optimum sample size of least variance, and using the optimum sample size to calculate the current moving mean value, the exponentially smoothed average value, and the standard deviation.

3. The method of claim 1 further comprising determining whether to buy a specific ITU by examining all of the buy recommendations for all ITU's in the user's entire portfolio and adjusting the buy recommendations based upon cash available to the user.

4. The method of claim 1, wherein the whereby clause is performed in the following order:
whereby,
if the current market price of the selected ITU within the portfolio decreases below the current moving mean value minus one standard deviation, and decreases below or equal to the exponentially smoothed average then calculate an optimum number of additional ITU's to buy at the current market price and provide a buy recommendation to the user to buy an optimum number of ITU's, wherein the optimum number of ITU's to buy is determined by: (1) checking amount of cash available for purchasing ITU stocks, (2) segmenting the cash available to provide a segmented fund for each recommended ITU stock purchase, and (3) calculating the number of ITU's to buy according to the product of segmented funds and the strength of the buy recommendation divided by the current market price of the ITU stock, else if the current market price of the selected ITU within the portfolio increases by more than one standard deviation greater than the moving mean, and greater than or equal to the exponentially smoothed average, and greater than the average purchase price paid for the selected ITU then estimate a sell advice value for each selected ITU and calculate an optimum number of ITU's shares to sell at current market price and recommend that the user sell the optimum number of ITU's, wherein the optimum number of ITU's to sell is determined by multiplying the number of ITU stocks within each selected ITU by the sell advice value for each selected ITU, else recommend that the user neither buy nor sell any of the selected ITU's.

5. A computer system for determining whether to buy, sell, or hold a specific Individually Traded Unit (ITU) said specific ITU comprising at least one held ITU, said computer system comprising a CPU and associated memory configured to perform the following steps:

allowing a user to select a specific ITU for analysis;

receiving as input a sequence of current market trading prices of the ITU over a desired time period including a current trading price;

sampling prices from the sequence of trading prices at desired time intervals;

calculating an exponentially smoothed average of the sampled prices;

calculating a current moving mean value for the sampled prices;

providing an average purchase price paid by the user for the held ITU's in the selected ITU;

performing a variance and a standard deviation analysis of the current moving mean;

estimating a sell advice value for each selected ITU;

calculating an optimum number of ITU's to unload at the current trading price, said component being activated when the current trading price of the selected ITU increases by more than one standard deviation greater than the smoothed mean, and is greater than or equal to the exponentially smoothed average and greater than the average purchase price paid for the held ITU's, wherein the optimum number of ITU's to unload is calculated by multiplying the number of held ITU's in the selected ITU by the strength of the sell advice;

calculating an optimum number of ITU's to purchase at the current trading price, said component being activated when the current trading price of the selected ITU within the portfolio decreases below the current moving mean value minus one standard deviation, and decreases below the exponentially smoothed average, wherein the optimum number of ITU's to buy is determined by: (1) checking amount of cash available for purchasing ITU's, (2) segmenting the cash available to provide a segmented fund for each recommended ITU stock purchase, and (3) calculating the number of ITU's to buy according to the product of segmented funds and the strength of the buy recommendation divided by the current trading price of the ITU stock; and producing an output report to an output device.

6. The computer system of claim 5 further comprising a component to calculate a number of sampled prices to comprise an optimum sample size that will be used as a basis for calculating the current moving mean value.

7. Computer software on a computer readable storage medium wherein said software comprises modules having computer instructions for determining whether to buy, sell, or hold a specific Individually Traded Unit (ITU) of publicly traded units residing in a securities or investment portfolio owned or controlled by a user, wherein the portfolio continually adjusts trade statistics of each ITU, said software comprising:

a) a module to set an optimum sample size of ITU price values, wherein the optimum sample size is determined by calculating the mean, standard deviation, and variance for each ITU from a user defined maximum sample size of price data to a user defined minimum sample size of price data and then identifying the sample size in the range from said maximum sample size to said minimum sample size that has the lowest variance, the sample size with the lowest variance being the optimum sample size;

b) a module to exponentially smooth the ITU price values;

c) a module to calculate advice to be presented to the user;

d) a module to determine whether to buy ITU's and how many ITU's to buy, wherein a buy recommendation is triggered when the current price of an ITU is less than the mean price of the ITU minus the standard deviation of the ITU price and the current price is less than or equal to the exponentially smoothed price for the ITU;

e) a module to determine whether to sell ITU's and how many ITU's to sell, wherein a sell recommendation is triggered when the current price of an ITU is greater than the mean price of the ITU plus the standard deviation of the ITU price and the current price is greater than or equal to the exponentially smoothed price of an ITU and the current price is also greater than the average price and fees paid per ITU share;

f) a module to summarize results; and, g) a module to create an output report, wherein modules a) through g) are executable on a computer system.

8. The computer software of claim 7 wherein the module to set an optimum sample size determines said size by calculating between a maximum and a minimum range of ITU price values, a mean, a variance, and a standard deviation, and setting the optimum sample size to that with the lowest variance for greater visibility of significant digits.

9. The computer software of claim 8 wherein the module to calculate advice generates a recommendation to the user whether to buy, sell, or hold shares of a particular ITU.

10. The computer software of claim 9, wherein a recommendation to buy is made when the ITU price value is less than the mean minus one standard deviation and the ITU price is less than or equal to the exponentially smoothed average ITU price, wherein a recommendation to sell is made when the ITU price is greater than the mean plus one standard deviation and the ITU price is greater than or equal to the exponentially smoothed average ITU price and when a current trading price of the ITU is greater then an AverageCost (G_AC), wherein the Average cost is the average cost paid over a selected time period for each individual share in the ITU.

11. The computer software of claim 10, wherein the module to determine whether to buy ITU's is activated by the recommendation to buy, and once activated checks to see that the ITU price is not below a preset lower limit and cancels the buy recommendation if the price is below that limit.

12. The computer software of claim 10, wherein the module to determine whether to sell ITU's is activated by the recommendation to sell, and once activated checks to see that three conditions are met, namely:

that the portfolio comprises the ITU;

that a profit will be made that is greater than a broker's fee, and that cash-on-hand for the user is greater than the broker's fee, and cancels the sell recommendation if any of these conditions are not met.

13. The computer software of claim 11, wherein a further determination whether to buy a specific ITU is made by examining all of the buy recommendations for all ITU's in the user's entire portfolio and adjusting the buy recommendations based upon cash available to the user.

14. The computer software of claim 7, wherein the user in step (c) is a brokerage firm.

* * * * *